United States Patent
Spero et al.

(10) Patent No.: US 11,768,038 B2
(45) Date of Patent: Sep. 26, 2023

(54) THERMAL STORAGE DEVICE WITH IMMISCIBLE STORAGE MEDIA

(71) Applicant: Thermal Storage Systems, Los Angeles, CA (US)

(72) Inventors: Alan J. Spero, Ramona, CA (US); Frank Stephen Wyle, Los Angeles, CA (US); Donald Douglas Spani, Ramona, CA (US)

(73) Assignee: Thermal Storage Systems, Los Angeles, CA (US)

( * ) Notice: Subject to any disclaimer, the term of this patent is extended or adjusted under 35 U.S.C. 154(b) by 50 days.

(21) Appl. No.: 17/486,296

(22) Filed: Sep. 27, 2021

(65) Prior Publication Data

US 2022/0120514 A1   Apr. 21, 2022

Related U.S. Application Data

(60) Provisional application No. 63/083,797, filed on Sep. 25, 2020.

(51) Int. Cl.
*F28D 20/02* (2006.01)
*F28D 20/00* (2006.01)

(52) U.S. Cl.
CPC .... *F28D 20/025* (2013.01); *F28D 2020/0013* (2013.01)

(58) Field of Classification Search
CPC ........... F28D 20/025; F28D 2020/0013; F28D 20/003
See application file for complete search history.

(56) References Cited

U.S. PATENT DOCUMENTS 4,227,567 A * 10/1980 Greene ................. F28D 20/025
                                                     165/104.31
4,371,029 A *  2/1983 Lindner ............... F28D 20/025
                                                     165/111

(Continued)

FOREIGN PATENT DOCUMENTS

WO         WO 00/79202 A1    12/2000
WO      WO 2022/067183 A1     3/2022

OTHER PUBLICATIONS

Rawson, A et al.; Effective conductivity of Cu—Fe and Sn—Al miscibility gap alloys. International Journal of Heat and Mass Transfer 77 (2014) 395-405.

(Continued)

*Primary Examiner* — Jon T. Schermerhorn, Jr.
(74) *Attorney, Agent, or Firm* — Larry E. Henneman, Jr.; Henneman & Associates, PLC

(57) ABSTRACT

A thermal storage system includes a container, a thermal exchange device, a first thermal storage material, and a second thermal storage material. The first thermal exchange device is disposed in the container. The first thermal storage material is disposed in the container and is spaced apart from the thermal exchange device. The second thermal storage material is also disposed in the container in contact with the thermal exchange device. The first and second thermal storage materials are immiscible. The second thermal storage material is less reactive with the construction material of the thermal exchange device as compared to the first thermal storage material. Optionally, a second thermal exchange device can be submerged in the second thermal storage material. The first thermal exchange device is configured to supply heat to the second thermal storage material and the second thermal exchange device facilitates extraction of heat from the second thermal storage material.

20 Claims, 8 Drawing Sheets

(56) References Cited

U.S. PATENT DOCUMENTS

| | | | | |
|---|---|---|---|---|
| 4,446,910 A | * | 5/1984 | Miller | F28D 20/025 |
| | | | | 165/104.11 |
| 4,535,837 A | * | 8/1985 | Ishii | F28D 20/025 |
| | | | | 126/618 |
| 4,696,338 A | * | 9/1987 | Jensen | F28D 20/025 |
| | | | | 165/104.11 |
| 8,464,535 B2 | * | 6/2013 | White | F24S 60/10 |
| | | | | 60/659 |
| 9,732,988 B1 | * | 8/2017 | Spero | F24S 70/00 |
| 11,365,941 B2 | * | 6/2022 | Rilby | F28D 20/021 |

OTHER PUBLICATIONS

PCT Application Serial No. PCT/US2021/052205, International Search Report and Written Opinion dated Mar. 11, 2022.

* cited by examiner

THERMAL STORAGE DEVICE WITH IMMISCIBLE STORAGE MEDIA

RELATED APPLICATIONS

This application claims the benefit of priority of U.S. Provisional Patent Application No. 63/083,797, filed Sep. 25, 2020 by the same inventors, which is incorporated herein by reference in its entirety.

BACKGROUND OF THE INVENTION

Field of the Invention

This invention relates generally to heat transfer, and more particularly to thermal storage systems.

Description of the Background Art

Devices designed to store thermal energy fall into two broad categories based on whether they use sensible heat or latent heat as the storage mechanism. Latent heat-based technologies have the merit of delivering energy at a fixed temperature and can have a higher energy density (in J/kg or J/m$^3$) than sensible heat-based technologies. Thermal energy storage systems can also be operated in a combined latent heat and sensible heat mode if the application allows. Such a configuration can potentially double the amount of thermal energy that can be stored for a given amount of storage material.

In solar thermal electrical generating plants, liquid sodium and potassium nitrate salts are often used in a sensible heat mode in order to temporarily store solar-generated heat. The heat capacity of $NaNO_3$ is 1.53 J/g K, which gives a stored energy density of approximately 370 J/g when operated between its melting point (308° C.) and a maximum temperature of 550° C. If the salt were allowed to solidify as part of the storage cycle, the total stored energy density would be increased by the salt's heat of fusion of 161 J/g, giving a total stored energy of 531 J/g.

There have been many attempts to incorporate the liquid-to-solid phase change in salt-based thermal energy storage systems in order to achieve this significant increase in storage capacity. However, these attempts become confounded by the tendency of the salt to attach to the heat exchanger surface as the material solidifies. Solid salts typically have a very low thermal conductivity, so as the heat exchange surface becomes coated with solid salt, it impedes the transfer of heat energy and reduces the rate at which energy can be extracted (i.e., it limits the extractable power).

Researchers have investigated many techniques to prevent the solidifying salt from fouling the heat exchange surface. Recent attempts to encapsulate the salt in small spherical capsules that are then held in suspension in a high thermal conductivity fluid have been made to work, but are complex and necessarily reduce the net storable energy density because of the additional materials that only serve to help conduct the heat. Other attempts use mechanical pumps and a metallic heat transfer fluid that is circulated though the salt. Such approaches tend toward complexity and have not been commercially exploited.

SUMMARY

The present invention mitigates the problem of thermal storage material reactivity without limiting the rate at which energy may be extracted from (or inserted into) the phase change material (PCM).

In an example system, a thermally insulated container holds a predetermined amount of two thermal storage materials, the first of which exhibits a high latent heat of fusion and high thermal conductivity in both its solid and molten phase. The second material is immiscible with the first material and also exhibits high thermal conductivity in both its solid and molten phase. The container can be of any material that is relatively non-wetting to the molten thermal storage materials employed (e.g. molten aluminum). An example of a container material is aluminum oxide $Al_2O_3$, which is non-wetting to molten aluminum. Optionally, a coating of boron nitride may be used on the container walls to enhance the non-wetting properties of the material. By way of non-limiting example, the first thermal storage material can be an aluminum alloy, and the second thermal storage material can be elemental tin.

In an example system, the second thermal storage material (e.g. tin) may be more dense than the first thermal storage material (e.g. aluminum) and will, therefore, reside at the bottom of the container. The first material will reside on top of the second material. The two materials are immiscible in their liquid state, so the first material can float on top of the second material. Heat exchangers (e.g., thermally conductive conduits) may be immersed in one of the two materials that is relatively non-reactive with the material from which the heat exchanger is formed. For example, in an example configuration wherein aluminum and tin comprise the first and second materials respectively, heat exchangers fabricated of stainless steel can be disposed in the layer comprised of tin.

Heat can be transferred into the system for storage by moving a heat transfer fluid through an Input Heat Exchanger. Ideally the fluid temperature will exceed the melting temperature of both the first and the second material resulting in a phase change. Alternatively, heat may be directly applied to the bottom of the container from a flame or by other means. Heat can be extracted from the system by passing a heat transfer fluid through the Output Heat Exchanger.

Tubing/conduit coupled to provide heat transfer fluid to the two heat exchangers can either pass through holes in the container, or they can exit the module from the top. In the latter configuration, if the heat exchangers reside in the second material, the tubes can located behind a vertical barrier of a material similar to that of the container, so that the tubes are protected from contacting the molten first material.

The amount of second material in which the heat exchangers are disposed is determined so that the heat exchangers are completely immersed in that material. The amount of the first material is dependent on the desired storage capacity of the module. The module can operate in both a sensible heat and latent heat mode, between ambient temperature and some temperature above the melting temperature of the two materials.

In a particular example system, the first material is an aluminum alloy and the second material is elemental tin. Energy is stored in the device by passing a hot (>≈580° C.) heat transfer fluid through the Inlet Heat Exchanger or directly heating the bottom of the container. As the storage materials heat up, the tin melts as the temperature passes 232° C., the melting point of tin. After the tin is melted, the device configuration is such that the solid aluminum floats on top of the liquid tin. Further heating raises the temperature past the melting point of the aluminum. At this point the liquid aluminum floats on top of the liquid tin and the device has stored both sensible and latent heat.

Liquid tin and liquid aluminum are immiscible, and the density of the aluminum is lower than the density of the tin. Because the tin completely covers the heat exchangers at the bottom of the device, the aluminum does not come into contact with the tubing, thus preventing the liquid aluminum from corroding the tubing. The tubing material is chosen so that it is substantially inert to liquid tin and maintains its structural integrity at the operating temperatures, but this is typical of most metal tubing such as stainless steel.

To extract energy, a cool heat transfer fluid can be passed through the Output Heat Exchanger. This process cools the tin and the aluminum. While the aluminum remains liquid the temperature of the device will remain constant as heat is extracted. Eventually, the aluminum will solidify, at which point the solid aluminum plug will float in the still-liquid tin. The solid aluminum may be allowed to touch the heat exchangers, since solid aluminum will not corrode the tubes. Eventually the tin will also solidify as more energy is extracted. The very high thermal conductivity of the two metals permits very high rates of heat transport, making this a high power density storage device. The high heat of fusion of the aluminum gives the device a very high energy density.

Optionally, a single heat exchanger can be used to inject and extract heat, if it is not necessary to store and extract energy simultaneously.

Various embodiments provide some or all of the following advantages. One advantage is that a thermal storage device can exhibit both high energy density and high power density by storing thermal energy in the form of both sensible and latent heat. Another advantage is that the corrosive effects by the thermal storage material on the container and the heat exchange devices are reduced or avoided. As a result, the thermal storage materials can be selected for their high latent heat of fusion, without regard for potential corrosive effects on the heat exchanger(s) and container.

An example thermal storage system includes a container, a first thermal exchange device disposed in the container, a first thermal storage material, and a second thermal storage material. The first thermal storage material is disposed in the container spaced apart from the first thermal exchange device, and the first thermal storage material has a first reactivity with respect to a construction material of the first thermal exchange device. The second thermal storage material is disposed in the container in contact with the first thermal storage material and surrounding at least a portion of the first thermal exchange device. The second thermal storage material has a second reactivity with respect to the construction material of the first thermal exchange device. The second thermal storage material is immiscible with the first thermal storage material, and the second reactivity is less than the first reactivity. The first thermal exchange device can define a fluid path configured to carry a working fluid into, and out of, the container.

In an example thermal storage system, the first thermal storage material has a first density, the second thermal storage material has a second density, and the first density is less than the second density. In a more particular example system, the first thermal storage material can include aluminum, and the second thermal storage material can include tin. Optionally, the second thermal storage material can be elemental tin.

In an example thermal storage system, the first thermal storage material has a first melting point, the second thermal storage material has a second melting point, and the first melting point can be higher than the second melting point.

In an example thermal storage system, the first thermal storage material has a first latent heat of fusion value, the second thermal storage material has a second latent heat of fusion value, and the first latent heat of fusion value can be greater than the second latent heat of fusion value.

In an example thermal storage system, the first thermal storage material transitions from a solid state to a liquid state at a first temperature, the second thermal storage material transitions from a solid state to a liquid state at a second temperature, and the first temperature can be greater than the second temperature.

In an example thermal storage system, the first thermal storage material has a first specific heat, the second thermal storage material has a second specific heat, and the first specific heat can be greater than the second specific heat.

An example thermal storage system can further include a second thermal exchange device. The second thermal exchange device can be disposed in the container, and the second thermal storage material can be in contact with the second thermal exchange device. The second thermal storage material can surround at least a portion of the second thermal exchange device, and the first thermal storage material is spaced apart from the second thermal exchange device.

The first thermal exchange device can define a fluid path configured to carry thermal transfer fluid into, and out of, the container. The second thermal exchange device can also define a fluid path configured to carry thermal transfer fluid into, and out of, the container. The first thermal exchange device can be configured to supply heat to the second thermal storage material, and the second thermal exchange device can be configured to transport heat out of the second thermal storage material. The fluid path of the first thermal exchange device can be isolated from the fluid path of the second thermal exchange device.

In an example thermal storage device, the first thermal storage material has a first melting point, the second thermal storage material has a second melting point, and the construction material of the first thermal exchange device has a third melting point. The third melting point is greater than the first melting point, and the third melting point is greater than the second melting point.

The construction material of the first thermal exchange device can include stainless steel. The first thermal storage material can include aluminum, and the second thermal storage material includes tin. The container can include an interior surface that is non-wetting to the first thermal storage material when the first thermal storage material is in a liquid state. Optionally, the container can be formed at least partially from aluminum oxide. As another option, the interior surface of the container can include a boron nitride coating. As yet another option, an inert gas can be disposed in the container.

In an alternate example thermal storage device, the container defines an interior volume and includes a divider that can divide an upper portion of the interior chamber into a first section and a second section. The divider can be spaced apart from a bottom of the container. The second thermal storage material can fill the bottom of the container to a level above a bottom of the divider, and a top surface of the second thermal storage material can form a bottom of the first section and the second section of the upper portion of the interior chamber. The first thermal storage material can be disposed in the first section of the upper portion of the interior chamber, but not in the second section of the upper portion of the interior chamber.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a thermal storage system that utilizes a first thermal storage material to protect a heat exchanger and a second thermal storage material capable of storing more energy. In the following description, numerous specific details are set forth (e.g., thermal storage material types, thermal exchange device types, etc.) in order to provide a thorough understanding of the invention. Those skilled in the art will recognize, however, that the invention may be practiced apart from these specific details. In other instances, details of well-known heat transport practices (e.g., thermal transfer fluids, heat pipes, etc.) and components have been omitted, so as not to unnecessarily obscure the present invention.

Figure 1:
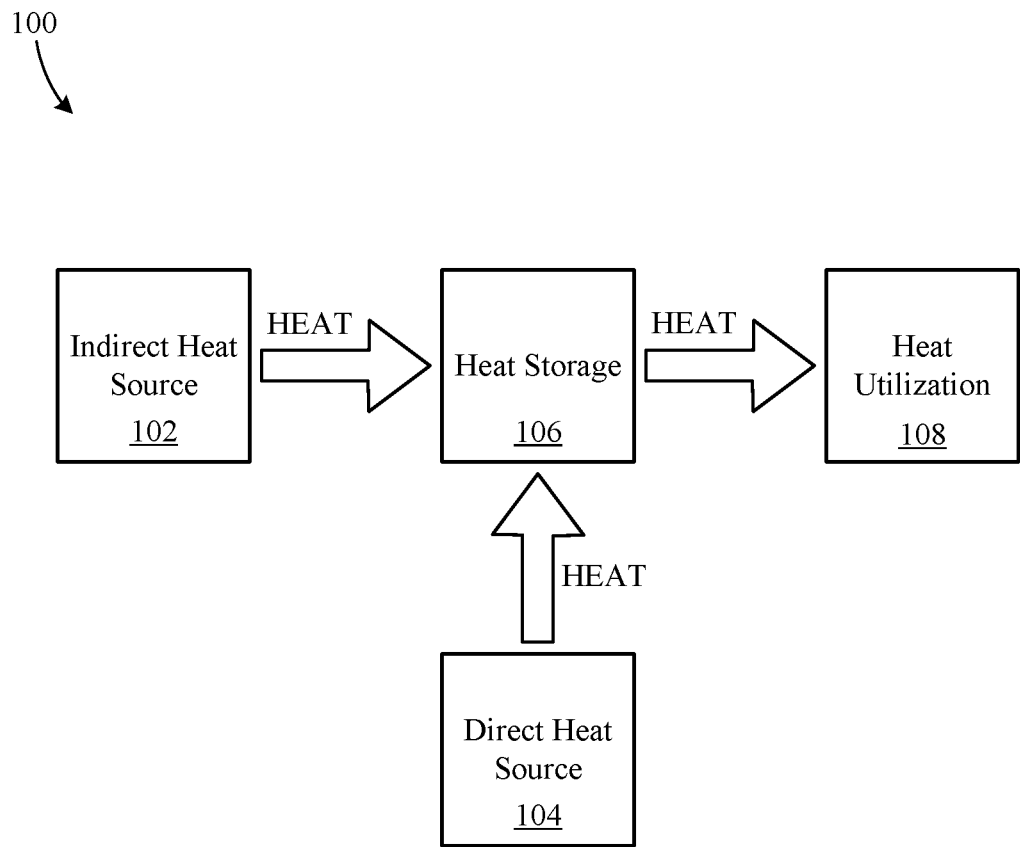
FIG. 1 is a block diagram of thermal storage system.

FIG. 1 shows a system 100 for storing thermal energy for later use. System 100 is particularly useful for storing and using energy in remote locations where other power sources are limited or are not available. Accordingly, system 100 may be a portable system in that it can be assembled, used, disassembled, transported, and reassembled. Alternatively, system 100 may be a much larger scaled, permanent system to provide power to a building, factory, utility, etc. The thermal energy that is captured and stored by system 100 may be used to heat water, power electrical generators, power thermoelectric devices, provide useful heat, or any other purpose.

System 100 includes an indirect heat source 102, a direct heat source 104, a heat storage system 106, and a heat utilization system 108. Indirect heat source 102 may include any suitable type of heat source that supplies heat energy to heat storage system 106 from an external source. The heat from indirect heat source 102 may be carried to heat storage system 106 through a thermal pathway such as, for example, supplying heated thermal transfer fluid (e.g., liquid, gas, etc.) thereto. Heat may be transferred from indirect heat source 104 to heat storage system 106 through alternative heat transfer devices such as, for example, heat pipes. Direct heat source 102 supplies heat directly to heat storage unit 106 without having to be transferred thereto through a thermal transfer fluid, heat pipe, etc. For example, direct heat source 104 may include a fuel burning device that heats thermal storage medium within heat storage system 106, a solar light concentrator (e.g., lens), etc. The heat supplied to heat storage system 106 by indirect heat source 102 and/or direct heat source 104 is stored in heat storage 106 and then supplied to heat utilization 108 through, for example, a circulating fluid pathway, heat pipe, etc. Heat utilization 108 may include any suitable means for transforming heat energy into any other type of useful energy. For example, heat utilization 108 may include thermal electric chips for converting heat into electrical energy. As another example, heat utilization 108 may include a water heater for heating a reservoir of water with the heat supplied by heat storage system 106. Heat utilization 108 may include devices (e.g. Stirling engine) for converting the heat supplied by heat storage system 106 into mechanical energy. These are only a few non-limiting examples of heat utilization systems that can be used.

Figure 2:
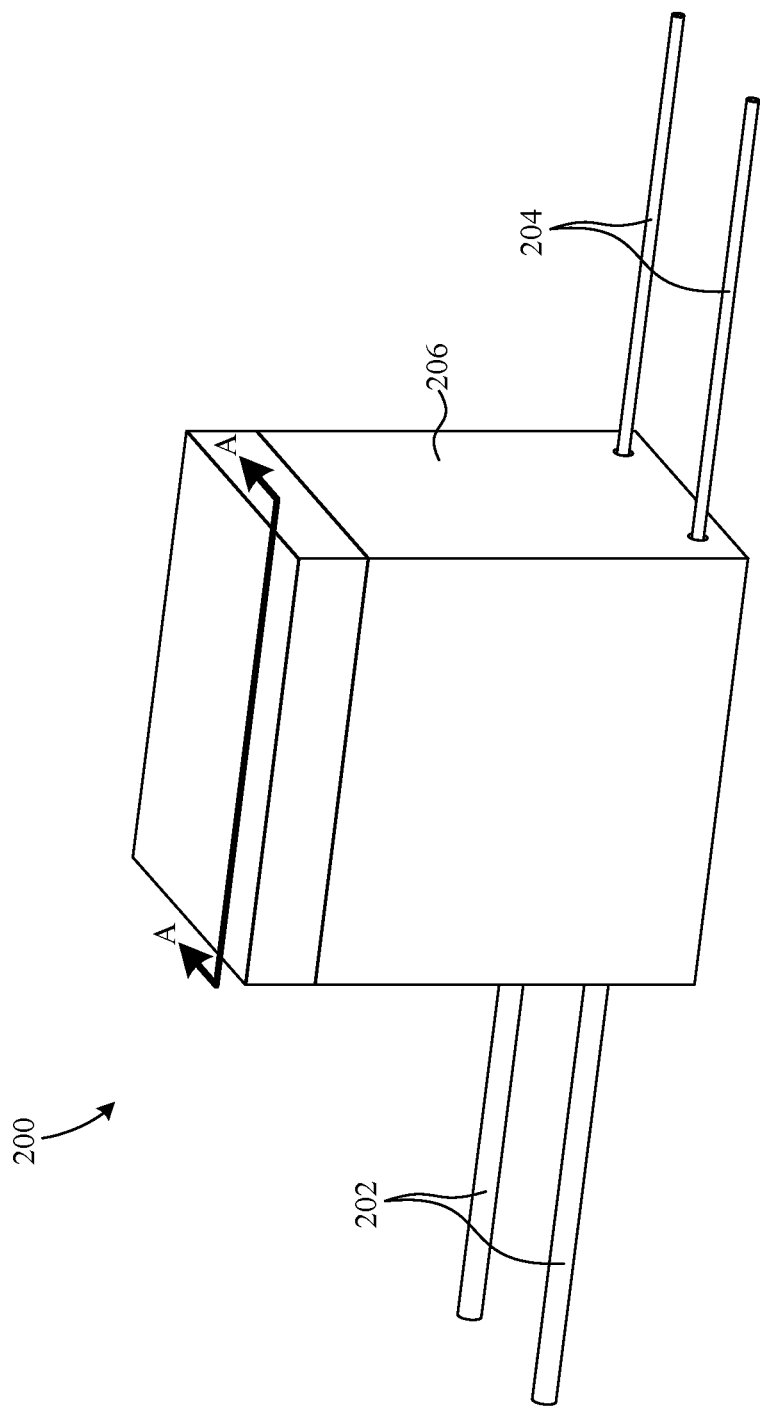
FIG. 2 is a perspective view of a thermal storage unit of the thermal storage system of FIG. 1.

FIG. 2 shows a perspective view of a thermal storage unit 200 of heat storage system 106. In this particular embodiment, thermal storage unit 200 includes a first thermal exchange device 202 and a second thermal exchange device 204. First thermal exchange device 202 is configured to carry heat from indirect heat source 102 to thermal storage unit 200 via a thermal transfer fluid circulating therethrough. Second thermal exchange device 204 is configured to carry heat from thermal storage unit 200 to heat utilization 108 via a thermal transfer fluid circulating therethrough. Thermal storage unit 200 further includes an insulation jacket 206 that mitigates heat escape from inside of thermal storage unit 200 into the surrounding atmosphere.

Optionally, thermal storage unit 200 can include only a single thermal exchange device. For example, if thermal storage unit 200 is not required to receive heat energy and output heat energy at the same time, then the same thermal exchange device (e.g., 202 or 204) can be used to transfer heat energy into and out of thermal storage unit 200 at different times.

Figure 3:
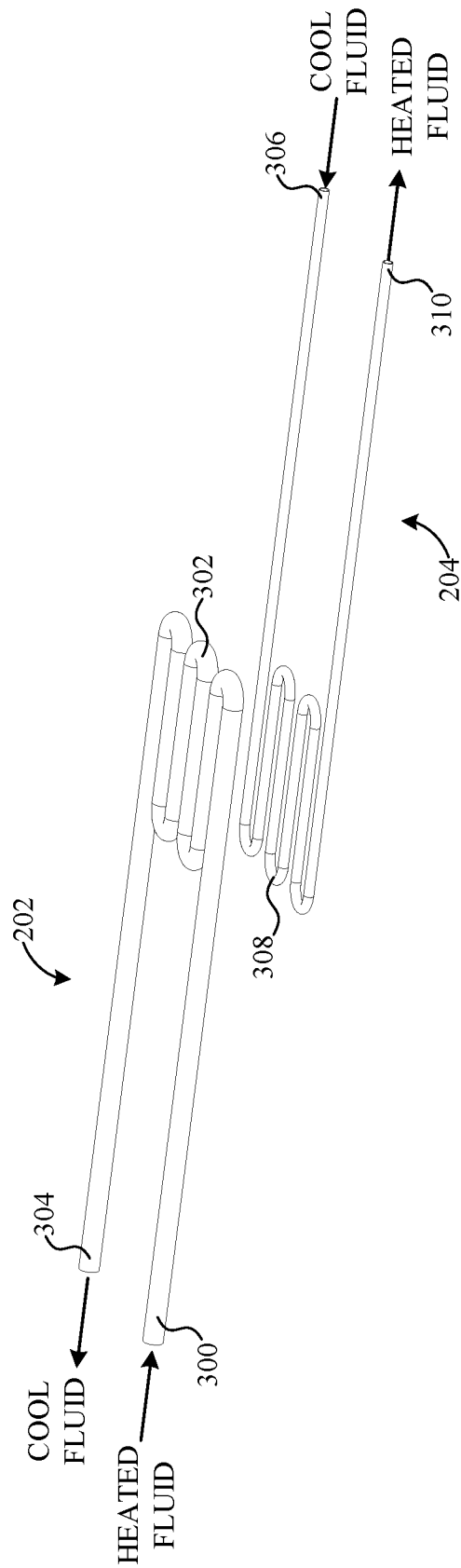
FIG. 3 is a perspective view of two thermal exchange devices of the thermal storage unit of FIG. 2.

FIG. 3 shows a perspective view of first thermal exchange device 202 and second thermal exchange device 204. As shown, each of first thermal exchange device 202 and second thermal storage device 204 are separate fluid systems. In this non-limiting example, thermal exchange devices 202 and 204 are formed from stainless steel, which has a relatively high thermal conductivity and low chemical reactivity with other materials.

First fluid exchange device 202 is a conduit including a fluid inlet 300, an intermediate portion 302, and a fluid outlet 304. Fluid inlet 300 is a passage through which thermal transfer fluid heated by a heat source first enters first thermal exchange device 202. The heated fluid continues to intermediate portion 302 and meanders therethrough while heat from the thermal transfer fluid conducts through the sidewalls and, therefore, out of the fluid. While the thermal transfer fluid passes through intermediate portion 302, it cools along the way. The cooled thermal transfer fluid then exits through outlet 304 where it is carried back to indirect heat source 202 to be reheated and redelivered to inlet 300.

Second fluid exchange device 204 is a conduit including a fluid inlet 306, an intermediate portion 308, and a fluid outlet 310. Fluid inlet 306 is a passage through which thermal transfer fluid from heat utilization 108 first enters first thermal exchange device 204. The fluid continues to intermediate portion 308 and meanders therethrough while heat from thermal storage unit 200 conducts through the sidewalls and into the fluid passing therethrough. While the thermal transfer fluid passes through intermediate portion 308, it heats up (i.e., absorbs thermal energy and increases in temperature) along the way. The heated thermal transfer fluid then exits through outlet 310 where it is carried back to heat utilization 108 to be used as heat or converted into another useful form of energy.

Figure 4:
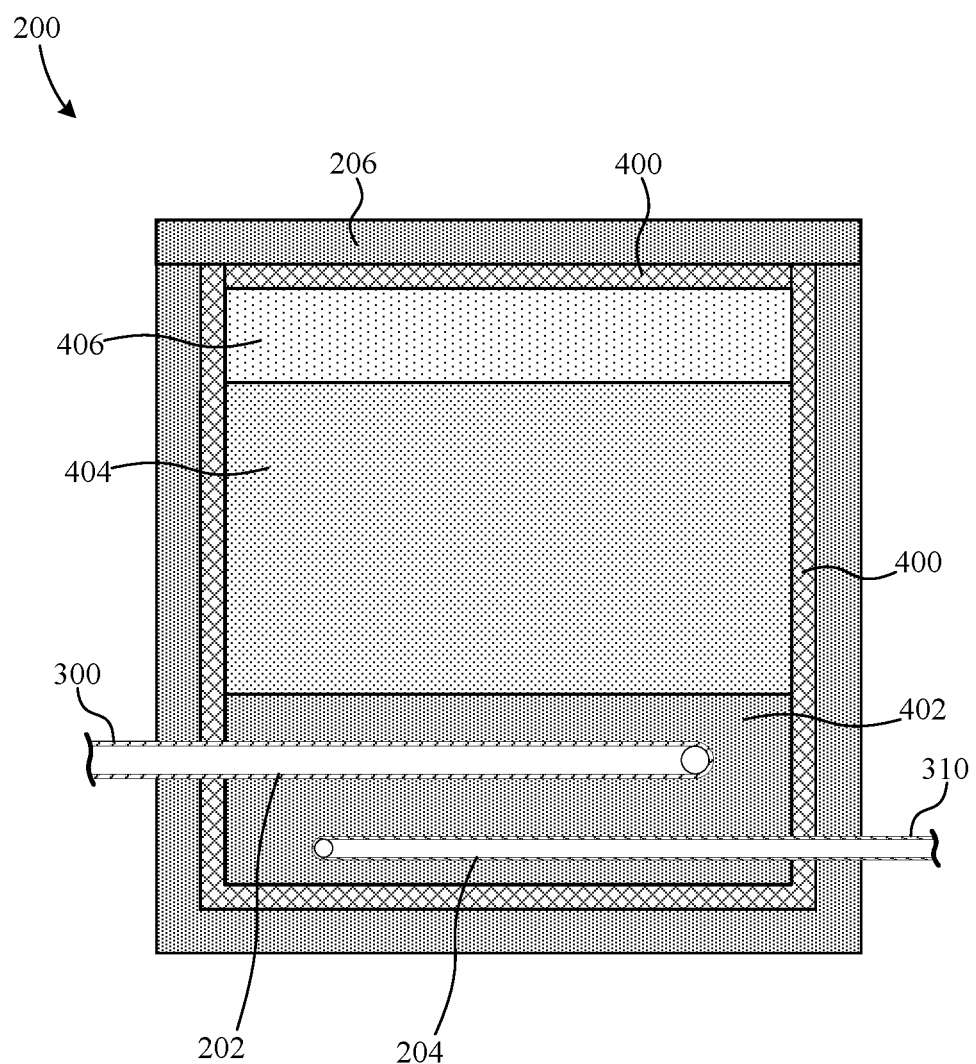
FIG. 4 is a cross sectional view of the thermal storage unit of FIG. 2 taken along line A-A of FIG. 2, when both thermal storage materials of the thermal storage unit are in liquid states.

FIG. 4 is a cross-sectional side view of thermal storage unit 200 taken along line A-A of FIG. 2. As shown, thermal storage unit 200 further includes a container 400, having a first thermal storage material 402, a second thermal storage material 404, and a ullage of inert gas 406 disposed therein. Inlet 300 and outlet 304 of thermal exchange device 202 extend through openings in the sidewall of container 400, while intermediate portion 302 is completely submerged in, and encapsulated by, first thermal storage material 402. Likewise, inlet 306 and outlet 310 of thermal exchange device 204 extend through openings in the sidewall of container 400 while intermediate portion 308 is completely submerged in, and encapsulated by, first thermal storage material 402. Second thermal storage material 404 is disposed directly on first thermal storage material 402 and inert gas 406 occupies the rest of the interior space of container 400. Optionally, changes in pressure of gas 406 with heating can be mitigated through the use of a separate ullage connected by a pipe or other means. Container 400 includes a lid 408 to prevent the materials in container 400 from escaping while also preventing unwanted debris from entering.

The relative material properties of thermal exchange devices 202 and 204, thermal storage materials 402 and 404, inert gas 406, and container 400 provide important advantages. For example, materials that have desirable thermal storage properties (e.g., aluminum, aluminum alloys, and other reactive metals and materials) can be used despite their undesirably high reactivities.

Thermal storage material 402 has a greater density than thermal storage material 404 so that thermal exchange devices 202 and 204 remain submerged therein and free from contact with the otherwise corrosive thermal storage material 404, even when one or more of thermal storage materials 402 and 404 is in a liquid state. Further, thermal storage materials 402 and 404 are immiscible with one another and, therefore, remain separated regardless if they are in liquid or solid states. Although thermal storage material 404 is less dense than thermal storage material 402, thermal storage material 404 has both a higher specific heat and latent heat of fusion than thermal storage material 402. Accordingly, thermal storage unit 200 is capable of storing more energy than it would if thermal storage material 404 were replaced by the same volume of thermal storage material 402. If thermal storage material 402 were replaced by more of thermal storage material 404, thermal storage unit 200 would be able to store more energy but would cause corrosion to thermal exchange devices 202 and 204. As previously mentioned, the chemical reactivity between thermal storage material 402 and thermal exchange devices 202 and 204 is less than the chemical reactivity between thermal storage material 404 and thermal exchange devices 202 and 204. Furthermore, the melting temperature of thermal storage material 404 is higher than that of thermal storage material 404. Both thermal storage materials 402 and 404 maintain high thermal conductance in both the liquid and solid state.

In this non-limiting example, container 400 is formed from aluminum oxide ($Al_2O_3$), thermal exchange devices 202 and 204 are formed from stainless steel, thermal storage material 402 is elemental tin, thermal storage material 404 is aluminum alloy, and inert gas 406 can be nitrogen or some other gas that is less reactive with aluminum. The aluminum oxide of container 400 makes container 400 substantially non-wetting to molten aluminum. Optionally, the interior walls of container 400 may include a coating of boron nitride to further enhance the non-wetting properties of container 400. Thermal exchange devices 202 and 204 are formed from stainless steel, because stainless steel has a relatively high thermal conductivity with little to no chemical reactivity with respect to tin. Thermal storage material 402 is tin, because tin has a relatively high conductance in both liquid and solid state and, as previously mentioned, does not corrode stainless steel. Thermal storage material 404 is chosen to be aluminum alloy in-part because aluminum alloy is capable of storing more energy than tin and is also less dense. As illustrated in FIG. 4, both thermal storage materials 402 and 404 are shown heated to liquid states. Even in the liquid states, tin and the aluminum alloy remain immiscible, and stainless steel thermal exchange devices 202 and 204 remain isolated from the relatively reactive aluminum alloy.

Figure 5:
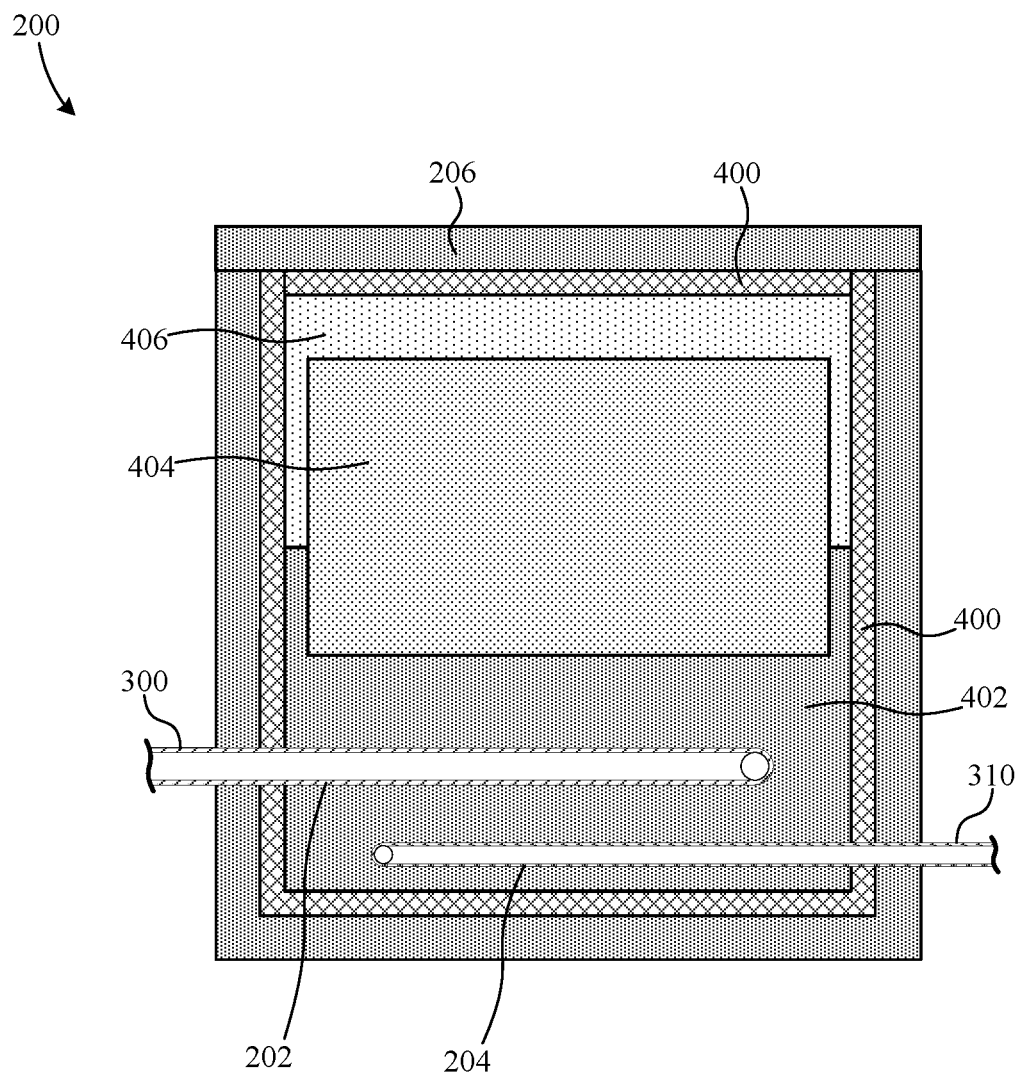
FIG. 5 is a cross sectional view of the thermal storage unit of FIG. 2 taken along line A-A of FIG. 2, when one of the thermal storage materials of the thermal storage materials is in a liquid state and the other is in a solid state.

FIG. 5 is a cross-sectional side view of thermal storage unit 200 taken along line A-A of FIG. 2, at a temperature where thermal storage material 402 is in a liquid state and thermal storage material 404 is in a solid state. The configuration of aluminum alloy thermal storage material 404 differs between its solid and liquid states. In solid form, aluminum alloy thermal storage material 404 will float on/in the liquid tin thermal storage material 402, with approximately 40% of aluminum alloy thermal storage material 404 submerged in the tin thermal storage material 402, as shown. The dimensions of aluminum alloy thermal storage material 404 will be slightly smaller than the inner dimensions of container 400 due to thermal contraction of aluminum alloy thermal storage material 404 as it cools below its melting temperature. Aluminum alloy thermal storage material 404 will not adhere to the walls of container 400, which are made of a material that is non-wetting to molten aluminum alloy, thereby allowing aluminum alloy thermal storage material 404 to shrink without sticking to container 400. A coating of boron nitride applied to the interior walls of container 400 will enhance the non-wetting property of the aluminum alloy with respect to the walls of container 400. In liquid form, aluminum alloy thermal storage material 404 will spread to the interior walls of container 400 but will continue to float atop the tin thermal storage material 402.

Figure 6:
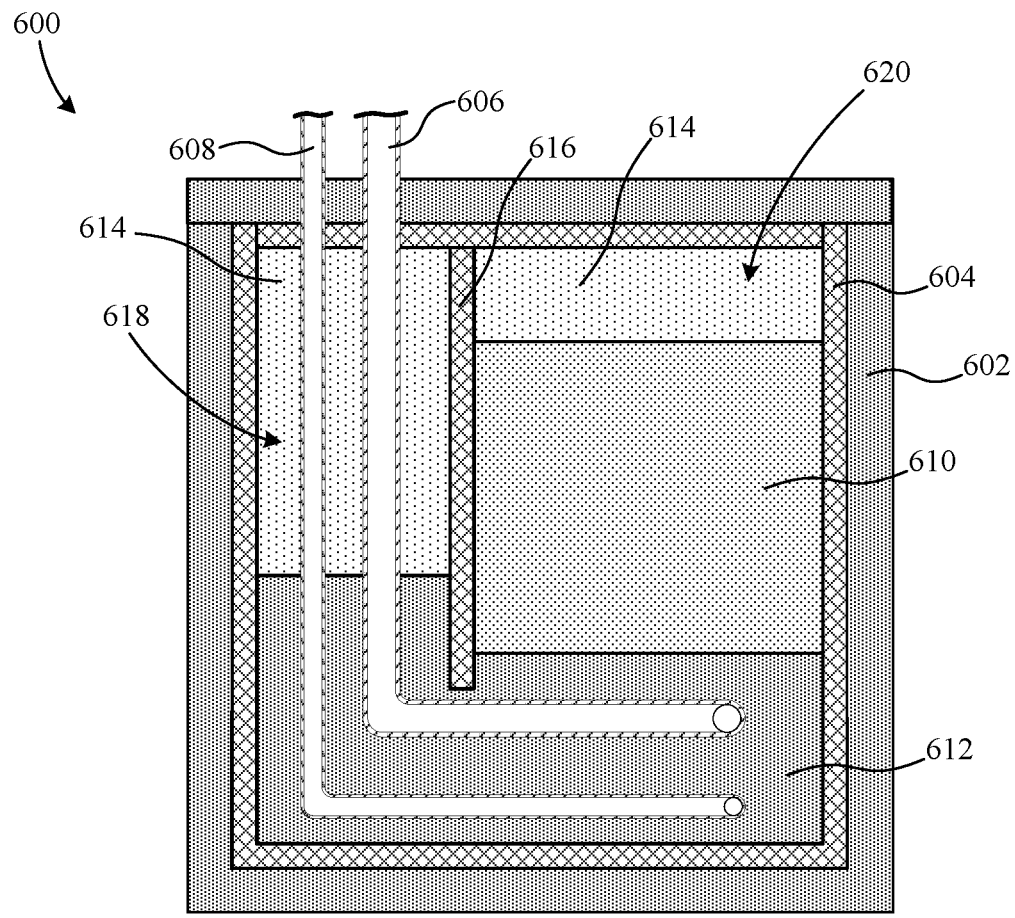
FIG. 6 is a cross sectional view of an alternate thermal storage unit.

FIG. 6 is a cross-sectional view of an alternate thermal storage unit 600, which includes an insulation jacket 602, a container 604, a first thermal exchange device 606, a second thermal exchange device 608, a first thermal storage material 610, a second thermal storage material 612, and a ullage of inert gas 614. Insulation jacket 602 functions the same as insulation jacket 206, but has a slightly modified configuration, wherein passages for thermal exchange devices 606 and 608 are located through the top of insulation jacket 602 rather than through the sides. Container 604 is formed from the same materials as container 400 but has a slightly different configuration. Thermal exchange devices 606 and 608 are formed from stainless steel and are substantially similar to thermal exchange devices 202 and 204, respectively, except that the inlets and outlets extend upward through the top of container 604 and insulation jacket 602. Thermal storage materials 610 and 612 are formed from aluminum alloy and elemental tin, respectively. Ullage of inert gas 614 is, for example, nitrogen or some other gas, which does not react with thermal storage materials 610 and 612. Optionally, inert gas 614 may be replaced by air.

To facilitate the entrance and exit of thermal exchange devices 606 and 608 through the top of container 604, container 604 is configured with an internal wall 616, which extends between opposing side walls of container 604, but does not extend down to the bottom of container 604. Instead, wall 616 extends from a height above the level of aluminum alloy thermal storage material 610 to a predetermined distance below the uppermost surface of the tin thermal storage material 612.

Wall 616 divides the upper portion of container 604 into a side chamber 618 and a main chamber 620. The thermal exchange devices 606 and 608 enter container 604 from the top, pass down through side chamber 618, pass under wall 616, and remain under the uppermost surface of aluminum alloy thermal storage material 610, where they are effectively isolated from first thermal storage material 610. The bottom portion of container 604 and side chamber 618 contains tin thermal storage material 612 and inert gas 614, but no aluminum alloy thermal storage material 610. First thermal storage material 610 remains in main chamber 620, floating on top of second thermal storage material 612. This arrangement allows the inlets and outlets of thermal exchange devices 606 and 608 to enter and exit chamber 618 (and be submerged in second thermal storage material 612) without penetrations through the side walls of container 604 and without contacting the aluminum alloy thermal storage material 610.

Example embodiments make use of two immiscible thermal storage materials. A first thermal storage material has a high thermal conductivity, but is significantly less reactive with other materials in its molten state as compared to a second thermal storage material. The second thermal storage material exhibits a high latent heat of fusion and high thermal conductivity in both its solid and liquid state, but may be highly reactive in its molten state in the presence of other materials. A non-limiting example of the first thermal storage material is elemental tin. A non-limiting example of the second thermal storage material is aluminum alloy. The two materials can be incorporated in a thermal storage system that permits thermal energy storage as both sensible and latent heat. The first material is used to isolate and protect heat transfer components (e.g. thermal exchange devices) from the corrosive effects of the second material, while facilitating efficient thermal transfer into and out of the two thermal storage materials.

Figure 7:
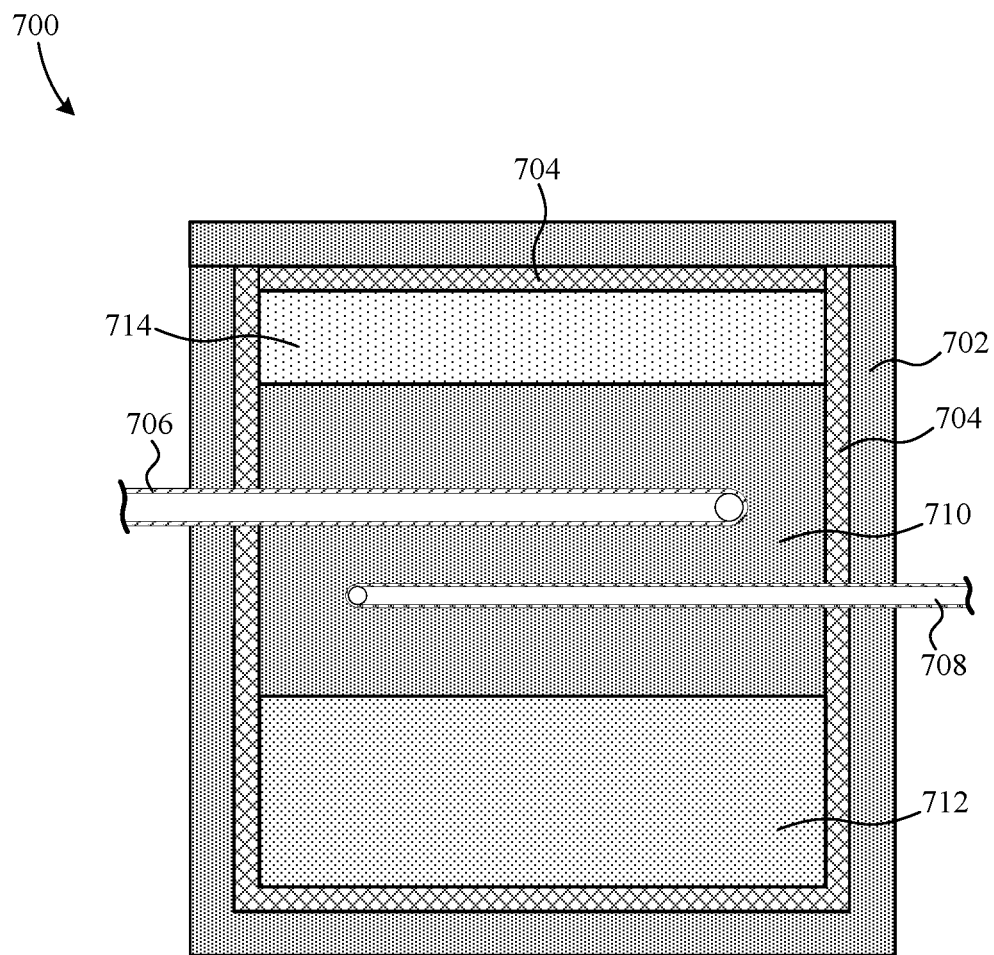
FIG. 7 is a cross sectional view of another alternate thermal storage unit.

FIG. 7 is a cross-sectional view of an alternate thermal storage unit 700, which includes an insulation jacket 702, a container 704, a first thermal exchange device 706, a second thermal exchange device 708, a first thermal storage material 710, a second thermal storage material 712, and a ullage of inert gas 714. Insulation jacket 702 functions the same as insulation jacket 206 but has a slightly modified configuration, wherein thermal exchange devices 706 and 708 pass through the walls of container 704 at slightly higher locations to accommodate for thermal storage material 710 being less dense than thermal storage material 712. Alternatively, exchange devices 706 and 708 could enter and exit through the top/lid of container 704. Container 704 is formed from the same materials as container 400, in this example, thermal exchange devices 706 and 708 are substantially similar to thermal exchange devices 202 and 204, respectively.

In previous example embodiments, the more reactive thermal storage material (e.g., aluminum) is less dense than the less reactive thermal storage material (e.g., tin). However, depending on material choice, it is possible that the more reactive thermal storage material might be denser than the less reactive material. In such a case, the less reactive material can float on top of the more reactive material, and the heat transfer components can simply be inserted into the top of the container and submerged in the upper, less reactive thermal storage material, without the need for an internal barrier as illustrated in FIG. 7.

Figure 8:
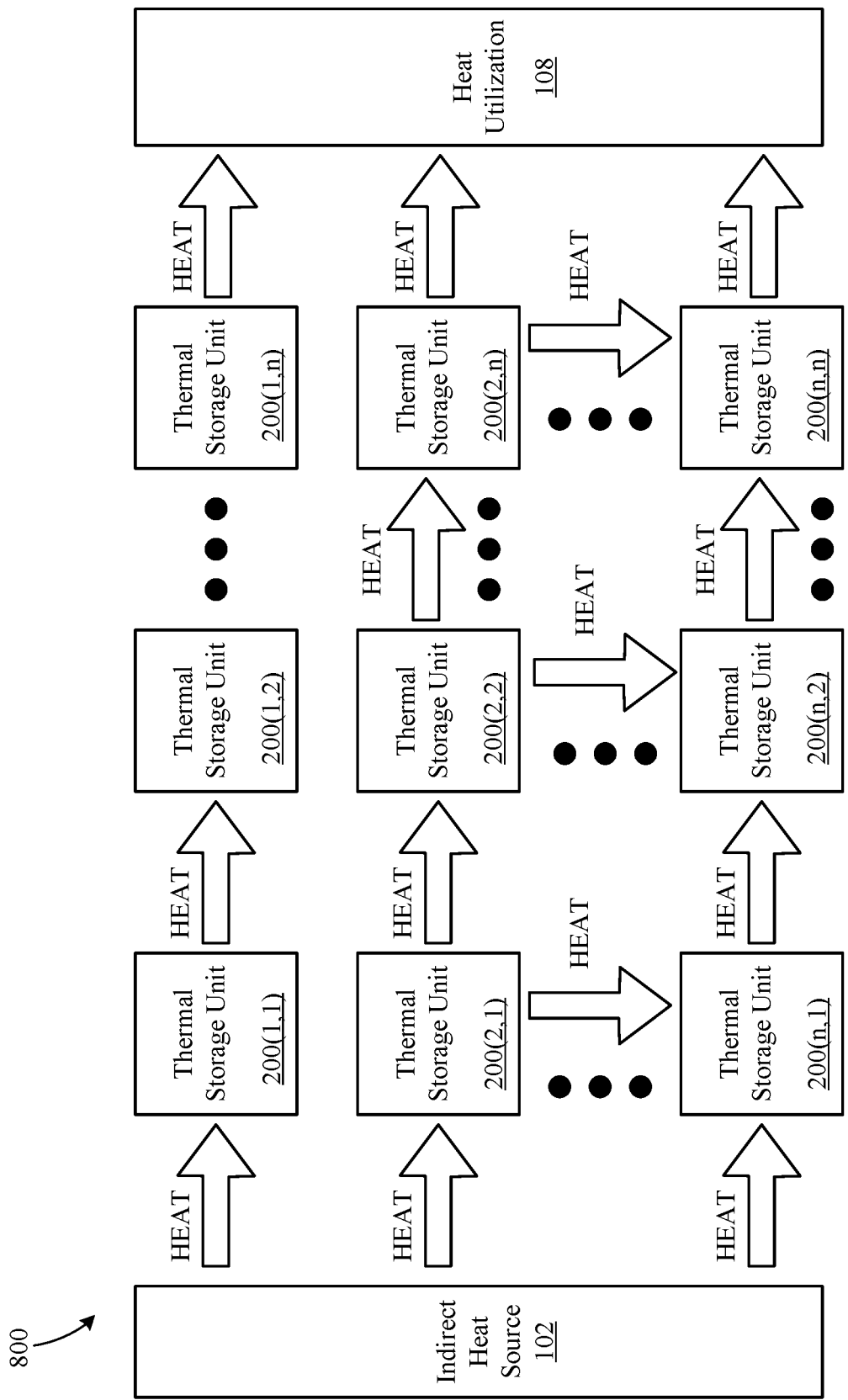
FIG. 8 is a block diagram of an alternate thermal storage system.

FIG. 8 shows an example thermal storage system 800 including indirect heat source 102, an array of thermal storage units 200, and heat utilization 108. Optionally, one or more of thermal storage units 200 could also be heated by one or more direct heat sources. Thermal storage units 200 are thermally connected together in an array wherein some of thermal storage units 200(1,1)-200(n,1) in the first column are supplied heat from indirect heat source 102 and the other thermal storage units 200(1,2)-200(n,) from the second column and 200(1, n)-200(n,n) from the nth column are supplied heat from thermal storage units 200(1,1)-200(n,1) of the first column. As shown, thermal storage units 200(1, 1)-200(1,n) of the first row are all thermally connected in series such that heat supplied to thermal storage unit 200(1, 1) is indirectly supplied to thermal storage unit 200(1,n). Thermal storage units 200(2,1)-200(2,n) of the second row are thermally connected to each other in series, but in parallel with thermal storage units 200(n,1)-200(n,n) of the nth row. By utilizing more storage units 200 in series and/or in parallel, the storage capacity of the system is greatly increased. In addition, the parallel configuration, increases the rate at which heat can be extracted from storage and transferred to heat utilization 108. By configuring a plurality of thermal storage units 200 to be thermally connected in both series and parallel, thermal storage units 200 can be made smaller and, therefore, more portable. For example, two small thermal storage units 200 having a hundred pounds of thermal storage media each, can store the same amount of energy as a single thermal storage unit 200 that has two hundred pounds of thermal storage media.

The description of particular embodiments of the present invention is now complete. Many of the described features may be substituted, altered or omitted without departing from the scope of the invention. For example, alternate numbers of thermal exchange devices (e.g., 1, 3, 4, etc.), may be substituted for the two thermal exchange devices shown in the examples. As another example, alternate thermal exchange devices (e.g., heat pipes, solid conductive bars, etc.), may be substituted for the fluid carrying thermal exchange devices. As yet another example, alternate thermal storage materials can be substituted for the thermal storage materials shown in the examples. These and other deviations from the particular embodiments shown will be apparent to those skilled in the art, particularly in view of the foregoing disclosure.

We claim:

1. A thermal storage system comprising:
a container;
a first thermal exchange device disposed in said container;
a first thermal storage material disposed in said container spaced apart from said first thermal exchange device, said first thermal storage material having a first reactivity with respect to a construction material of said first thermal exchange device;
a second thermal storage material disposed in said container in contact with said first thermal storage material and surrounding at least a portion of said first thermal exchange device, said second thermal storage material having a second reactivity with respect to said construction material of said first thermal exchange device, said second thermal storage material being immiscible with said first thermal storage material, and said second reactivity being less than said first reactivity.

2. The thermal storage system of claim 1, wherein:
said first thermal storage material has a first density;
said second thermal storage material has a second density; and
said first density is less than said second density.

3. The thermal storage system of claim 2, wherein said first thermal storage material includes aluminum.

4. The thermal storage system of claim 3, wherein said second thermal storage material includes tin.

5. The thermal storage system of claim 4, wherein said second thermal storage material is elemental tin.

6. The thermal storage system of claim 1, wherein:
said first thermal storage material has a first melting point;
said second thermal storage material has a second melting point; and
said first melting point is higher than said second melting point.

7. The thermal storage system of claim 1, wherein:
said first thermal storage material has a first latent heat of fusion value;
said second thermal storage material has a second latent heat of fusion value; and
said first latent heat of fusion value is greater than said second latent heat of fusion value.

8. The thermal storage system of claim 1, wherein:
said first thermal storage material transitions from a solid state to a liquid state at a first temperature;
said second thermal storage material transitions from a solid state to a liquid state at a second temperature; and
said first temperature is greater than said second temperature.

9. The thermal storage system of claim 1, wherein:
said first thermal storage material has a first specific heat;
said second thermal storage material has a second specific heat; and
said first specific heat is greater than said second specific heat.

10. The thermal storage system of claim 1, wherein said first thermal exchange device defines a fluid path configured to carry a working fluid into, and out of, said container.

11. The thermal storage system of claim 1, further comprising a second thermal exchange device and wherein:
said second thermal exchange device is disposed in said container;
said second thermal exchange device is in contact with said second thermal storage material;
said second thermal storage material surrounds at least a portion of said second thermal exchange device; and
said first thermal storage material is spaced apart from said second thermal exchange device.

12. The thermal storage system of claim 11, wherein:
said first thermal exchange device defines a fluid path configured to carry thermal transfer fluid into, and out of, said container;
said second thermal exchange device defines a fluid path configured to carry thermal transfer fluid into, and out of, said container;
said first thermal exchange device is configured to supply heat to said second thermal storage material;
said second thermal exchange device is configured to transport heat out of said second thermal storage material; and
said fluid path of said first thermal exchange device is isolated from said fluid path of said second thermal exchange device.

13. The thermal storage device of claim 1, wherein:
said first thermal storage material has a first melting point;
said second thermal storage material has a second melting point;
said construction material of said first thermal exchange device has a third melting point;
said third melting point is greater than said first melting point; and
said third melting point is greater than said second melting point.

14. The thermal storage device of claim 1, wherein said construction material of said first thermal exchange device includes stainless steel.

15. The thermal storage device of claim 14, wherein said first thermal storage material includes aluminum; and said second thermal storage material includes tin.

16. The thermal storage device of claim 1, said container includes an interior surface that is non-wetting to said first thermal storage material when said first thermal storage material is in a liquid state.

17. The thermal storage device of claim 16, wherein said container is formed at least partially from aluminum oxide.

18. The thermal storage device of claim 16, wherein said interior surface includes a boron nitride coating.

19. The thermal storage device of claim 1, further comprising a inert gas disposed in said container.

20. The thermal storage device of claim 1, wherein:
said container defines an interior volume;
said container includes a divider that divides an upper portion of said interior chamber into a first section and a second section, said divider being spaced apart from a bottom of said container;
said second thermal storage material fills said bottom of said container to a level above a bottom of said divider, a top surface of said second thermal storage material forming a bottom of said first section and said second section of said upper portion of said interior chamber; and
said first thermal storage material is disposed in said first section of said upper portion of said interior chamber, but not in said second section of said upper portion of said interior chamber.

* * * * *